United States Patent
Collins et al.

(10) Patent No.: US 8,901,048 B2
(45) Date of Patent: Dec. 2, 2014

(54) METHOD FOR DRILLING USING A DRILLING AND COMPLETION FLUID COMPRISING A PHOSPHATE BASED BLEND

(71) Applicant: Halliburton Energy Services, Inc., Houston, TX (US)

(72) Inventors: Natalia Collins, Spring, TX (US); Carl Thaemlitz, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/764,779

(22) Filed: Feb. 11, 2013

(65) Prior Publication Data

US 2013/0210683 A1  Aug. 15, 2013

Related U.S. Application Data

(62) Division of application No. 12/971,935, filed on Dec. 17, 2010.

(51) Int. Cl.
*C09K 8/05* (2006.01)
*C09K 8/84* (2006.01)

(52) U.S. Cl.
CPC .............. *C09K 8/05* (2013.01); *C09K 2208/12* (2013.01); *C09K 8/845* (2013.01)
USPC ........... 507/236; 507/141; 507/142; 507/235; 507/269; 507/276; 166/305.1

(58) Field of Classification Search
None
See application file for complete search history.

(56) References Cited

U.S. PATENT DOCUMENTS

| | | | | |
|---|---|---|---|---|
| 4,566,976 | A | * | 1/1986 | House et al. ................. 507/114 |
| 2008/0318812 | A1 | * | 12/2008 | Kakadjian et al. ............ 507/221 |
| 2010/0305010 | A1 | * | 12/2010 | Falana et al. ................. 507/274 |

* cited by examiner

*Primary Examiner* — John J Figueroa
(74) *Attorney, Agent, or Firm* — Holly Soehnge; Baker Botts L.L.P.

(57) ABSTRACT

A method for drilling through a producing zone in a subterranean formation or for completing a wellbore in a subterranean formation, using a drill-in and completion fluid comprising a blend of a phosphate brine and water.

17 Claims, No Drawings

METHOD FOR DRILLING USING A DRILLING AND COMPLETION FLUID COMPRISING A PHOSPHATE BASED BLEND

RELATED APPLICATION

This application is a division of U.S. patent application Ser. No. 12/971,935, filed Dec. 17, 2010, pending.

BACKGROUND OF THE INVENTION

1. Field of the Invention

The present invention relates to compositions for heavy brines systems for use as drill-in and completion fluids.

2. Description of Relevant Art

Drill-in fluids are drilling fluids used in drilling through a hydrocarbon producing zone (also called a pay zone) of a hydrocarbon bearing subterranean formation and completion fluids are fluids used in completing or recompleting or working over a well. Completion operations normally include perforating the casing and setting the tubing and pumps prior to, and to facilitate, initiation of production in hydrocarbon recovery operations. The various functions of drill-in, completion and workover fluids include controlling well pressure, preventing the well from blowing out during completion or workover, and preventing the collapse of the well casing due to excessive pressure build-up. The fluid is meant to help control a well without damaging the producing formation or completion components. Specific completion fluid systems are selected to optimize the well completion operation in accordance with the characteristics of a particular geological formation.

Choosing the right completion fluid is important because inappropriate fluids can have a significant impact on a project, not only during completion operations and well production startup, but also throughout the well's productive life. Experience has shown that some completion practices that work well in one location, such as, for example, the shelf of the Gulf of Mexico, may not work well or transfer directly to a different location, such as, for example, the deepwater environment. Deepwater completions can be more challenging because of the combination of younger formations, colder seafloor temperatures, greater hydrostatic pressures and interaction with subsea systems and control fluids.

Seldom is a regular drilling fluid suitable for completion operations due to its solids content, pH and ionic composition. Drill-in fluids can, in some cases be suitable for both drilling and completion work. Fluids can contain suspended solid matter consisting of particles of many different sizes. Some suspended material will be large enough and heavy enough to settle rapidly to the bottom of a container if a liquid sample is left to stand (the settable solids). Very small particles will settle only very slowly or not at all if the sample is regularly agitated or the particles are colloidal. These small solid particles cause the liquid to appear turbid (i.e., cloudy or hazy). The potential of particle invasion and/or filter cake buildup to damage a formation by reducing permeability in the producing zone has been recognized for many years. If permeability gets damaged, it cannot be 100 percent restored by any means. Loss in permeability means a decrease in anticipated production rates and ultimately in a decrease in production overall.

The importance of using clear completion and workover fluids to minimize formation damage is now well recognized and the use of clear heavy brines as completion fluids is now widespread. As used herein, "clear" or "clear and colorless" with respect to brine or completion fluids means that the fluid has an "NTU" (nephelometric turbidity unit) less than about 20. NTU is an American Petroleum Institute accepted unit related to the suspended solids in a brine (higher NTU=more suspended solids), based on how much light is scattered by a sample. The procedure for determining NTU is described in API RP 13J, "Testing of Heavy Brines," incorporated herein by reference, and is a procedure well known to those of ordinary skill in the art. As used herein, "heavy" with respect to brine or completion fluids means that the fluid has a density at least above about 10 lb/gal and most typically in the range of about 10 lb/gal to about 20 lb/gal, as needed to compensate for high downhole subterranean pressures.

Most such heavy brines used by the oil and gas industry are calcium halide brines, particularly calcium chloride or calcium bromide brines, or formate brines. However, halide brines can cause structural failure in corrosion resistant alloys, and chloride and bromide brines in particular are known to cause pitting corrosion and stress corrosion cracking of corrosion resistant alloys if oxygen or carbon dioxide is present. Formate brines do not cause such corrosion and cracking but are more costly to purchase and have some solubility problems at high density. Thus, there is continued interest in economically priced heavy brines that are not highly corrosive and that do not readily cause formation damage for use as completion fluids.

SUMMARY OF THE INVENTION

The present invention provides a phosphate based heavy brine drill-in and/or completion fluid. The fluid is prepared with a phosphate brine, preferably consisting essentially of water with phosphates dissolved therein, preferably in a quantity ranging from about 10 to about 20 lb/gal. Such a phosphate solution may be economically obtained from waste product from a sewage treatment plant, for example. This phosphate solution in turn is blended with water, preferably fresh water although sea water might alternatively be used, in a quantity such that the phosphate solution comprises more or less of the blend or even approximately half of the blend. For example, blends in the range of 25:75 phosphate brine to fresh water to blends of 75:25 phosphate brine to fresh water may be used. Corrosion inhibitors and/or clay inhibitors may optionally be added to the blend, although the fluid is less corrosive without inhibitors than calcium halide brines. Non-amine based corrosion inhibitors designed to prevent oxygen corrosion in monovalent brines are most effective.

Methods of the invention include a method of completing a wellbore in a subterranean formation employing a phosphate based heavy brine completion fluid as discussed above.

DETAILED DESCRIPTION OF PREFERRED EMBODIMENTS

The present invention provides a new, economical heavy brine completion fluid employing phosphates. That is, the primary salts comprising the brine are phosphates. Advantages of this invention include the opportunity to use a waste product—phosphate brine—from sewage treatment plants, for a useful purpose. Moreover, phosphates are already known in the oil and gas industry for utility as shale inhibitors and corrosion inhibitors. Thus, corrosion problems experienced with halide brines is not expected with phosphate based brines, or at least the corrosion should be significantly reduced.

In a preferred embodiment of the invention, potassium phosphate brine was obtained as waste product from a sewage treatment plant. The brine contained about 68% potassium phosphate and few other elements—essentially none of significance—(other than water) and had a density of about 15.1 lb/gal, as shown in Table 1 below.

TABLE 1

Phosphate Brine Composition

| Ionic Constituents | |
|---|---|
| ANIONS | |
| Chloride, wt % | 0.0006 |
| Fluoride, wt % | 0.0001 |
| Phosphate, wt % | 44.66 |
| Sulfate, wt % | |
| CATIONS | |
| Iron, wt % | 0.001 |
| Magnesium, wt % | 0.00003 |
| Potassium, wt % | 37.78 |
| Sodium, wt % | 0.099 |
| Probable Composition | |
| $K_3PO_4$, wt % | 68.37 |
| Density, lb/gal | 15.16 |

This phosphate based brine has high viscosity at temperatures as low as about 50° F. but thins at higher temperatures. Rheological properties are shown in Table 2 below.

TABLE 2

Rheological Properties - Tested with FANN 35A Viscometer

| | 74° F. | 100° F. | 120° F. |
|---|---|---|---|
| Plastic viscosity, cP | — | 75 | 49 |
| Yield point, bl/100 ft$^2$ | — | 0 | 0 |
| Apparent viscosity, cP | 150+ | 75 | 49 |
| FANN 35 Dial Readings | | | |
| 600 rpm | 300+ | 150 | 98 |
| 300 rpm | 176 | 75 | 49 |
| 200 rpm | 118 | 50 | 32 |
| 100 rpm | 60 | 26 | 16 |
| 6 rpm | 4 | 2 | 1 |
| 3 rpm | 2 | 1 | 1 |

At ambient temperature, the brine was too thick to measure at 600 rpm with the FANN 35 viscometer, but when heated, the brine thinned and became less viscous.

The True Crystallization Temperature (TCT) of the phosphate based brine is about 36° F., indicating again the utility of the brine as a completion fluid in high temperature wells. The True Crystallization Temperature was measured on clear phosphate brine using a manual crystalometer. During the initial test, the temperature was lowered at a high rate. The fluid became very viscous at about 50° F. and would not stir with a magnetic stirrer. The thermometer probe was then used to keep the brine agitated. The temperature dropped very fast and reached about 19° F. At that point, the fluid became glassy and then milky and even more viscous. The cooling was then stopped and the sample was allowed to heat up. At 39° F. the temperature began to drop a few degrees. This indicated a possible TCT. When the brine warmed to room temperature it did not become clear. Heat was applied and at about 100° F., the fluid cleared up to its original, clear, appearance. This procedure was repeated at a much slower cooling rate. The transition phase was reached at 36° F. and this temperature was thus determined to be the TCT. The brine thus has utility in reservoirs having temperatures higher than about 36° F. and as high as about 300° F. to 350° F. or higher.

For a drill-in or completion fluid, the phosphate brine is blended with water, most preferably fresh water rather than sea water. The blend may comprise more brine than water, less brine than water, or approximately a 50:50 blend. Thus, one example embodiment has a blend of 25:75 phosphate brine:water; another example embodiment has a blend of 75:25 phosphate brine:water, while still another example embodiment has a blend of 50:50 phosphate brine:water. A blend with sea water results in more precipitation. Heating (150° F.) does not seem to affect the amount of precipitation. Filtering might remove such precipitation after preparation, i.e., blending, of the completion fluid, to ready the fluid for use in completion operations. Sodium bromide might also be added, particularly to avoid precipitation or clouding of the fluid. In one embodiment, the fluid comprises about 10% by volume sodium bromide. In another embodiment, the fluid comprises about 20% by volume sodium bromide, resulting in a density of about 12.5 lb/gal. The maximum amount of sodium bromide, if any is to be added to the fluid, should not exceed about 60% by volume.

The pH of the brine is typically in the range of about 9 to about 11, but may be useful according to the invention as low as about 7. Corrosion inhibitors may be added to the blend. Examples of such inhibitors suitable for clear brine completion fluids include BARACOR 100, BARACOR 700 and BARAFILM, all available from Halliburton Energy Services, Inc. in Houston, Tex. and Duncan, Okla.

In the method of the invention, a completion fluid is prepared or provided using a blend of phosphate brine and water as described above and used in drilling through a producing zone (or pay-zone) in a subterranean formation and/or in completing a wellbore in a subterranean formation. The fluid may also be used in a workover operation or as a packer fluid. When used as a packer fluid, the fluid remains in the tubing-casing annulus above the packer in the wellbore. The advantage of the method of the invention is that the drilling or completion operation may be conducted with a completion fluid that is a clear heavy brine with few components that can potentially damage the formation. The fluid is not as corrosive as halide brines and contains as few components as essentially water and phosphate salt.

The foregoing description of the invention is intended to be a description of preferred embodiments. Various changes in the details of the described fluids and methods of use can be made without departing from the intended scope of this invention as defined by the appended claims.

What is claimed is:

1. A method comprising:
    introducing into a wellbore in a subterranean formation a fluid, wherein the fluid comprises water and a potassium phosphate based brine, wherein the volume ratio of the brine to the water of the fluid is from about 25:75 to about 75:25, the fluid has an NTU of less than about 20, and the density of the fluid is in the range of from about 10 lb/gal to about 20 lb/gal, and wherein the potassium phosphate based brine consists essentially of potassium phosphate and water and the potassium phosphate is present in an amount of from about 60% to about 75% by weight of the potassium phosphate based brine.

2. The method of claim 1 wherein the wellbore includes a packer and a tubing-casing annulus above the packer.

3. The method of claim 1 wherein the fluid remains clear at temperatures in the range of about 50° F. to about 350° F.

4. The method of claim 1 wherein the fluid further comprises sodium bromide in an amount of from about 10% to about 60% by volume of the fluid.

5. The method of claim 2, further comprising positioning the fluid in the tubing-casing annulus above the packer, and allowing the fluid to remain in the tubing casing annulus above the packer.

6. The method of claim 1, wherein the fluid further comprises a corrosion inhibitor.

7. The method of claim 1 wherein the water is fresh water.

8. The method of claim 1 wherein the water is sea water.

9. The method of claim 1 wherein the potassium phosphate based brine of the fluid is derived from a waste product from a sewage or water treatment plant.

10. A method comprising:
preparing a fluid comprising water and a potassium phosphate based brine, wherein the potassium phosphate based brine consists essentially of potassium phosphate and water and the potassium phosphate is present in an amount of from about 60% to about 75% by weight of the potassium phosphate based brine, and wherein the volume ratio of the brine to the water of the fluid is from about 25:75 to about 75:25, the fluid has an NTU of less than about 20, and the density of the fluid is in the range of from about 10 lb/gal to about 20 lb/gal; and introducing the fluid into a wellbore in a subterranean formation.

11. The method of claim 10 wherein the wellbore includes a packer and a tubing-casing annulus above the packer.

12. The method of claim 11, further comprising positioning the fluid in the tubing-casing annulus above the packer, and allowing the fluid to remain in the tubing casing annulus above the packer.

13. The method of claim 10 wherein the fluid remains clear at temperatures in the range of from about 50° F. to about 350° F.

14. The method of claim 10 wherein the fluid further comprises sodium bromide in an amount of from about 10% to about 60% by volume of the fluid.

15. The method of claim 10, wherein the fluid further comprises a corrosion inhibitor.

16. The method of claim 10 wherein the water is fresh water or sea water.

17. The method of claim 10 wherein the potassium phosphate based brine of the fluid is derived from a waste product from a sewage or water treatment plant.

* * * * *